Nov. 7, 1950 — J. T. HAYWARD — 2,528,883
WEIGHT ON BIT INDICATOR
Filed Jan. 31, 1946 — 3 Sheets-Sheet 1
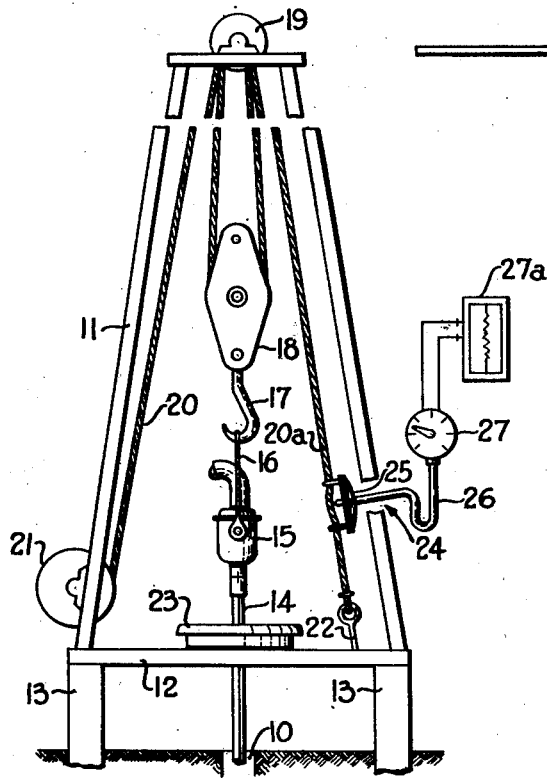
Fig 1
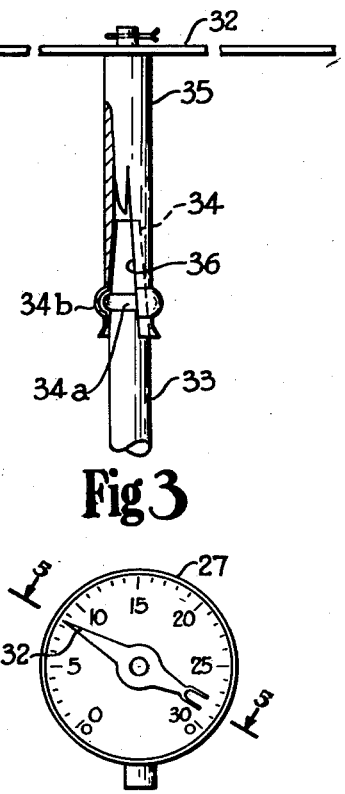
Fig 3
Fig 4
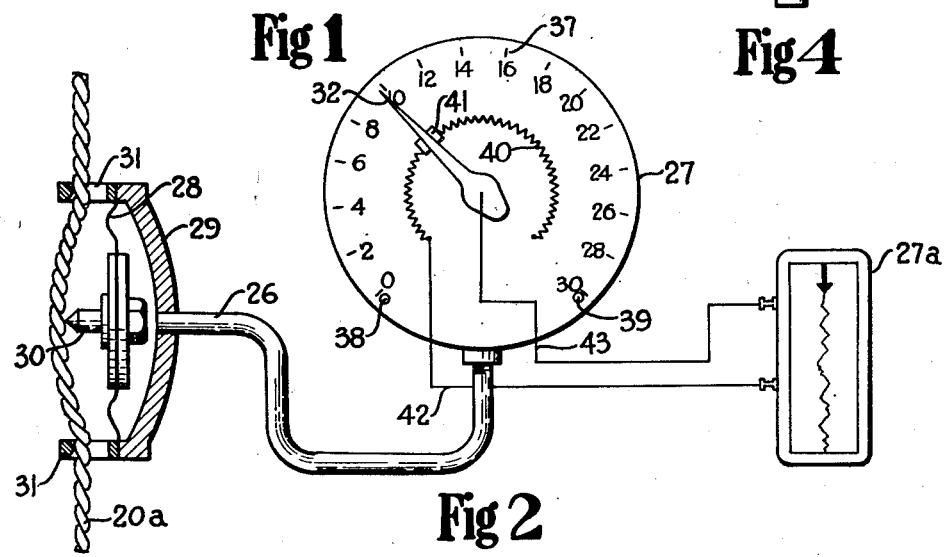
Fig 2
INVENTOR
John T. Hayward
BY
R. Werlin
ATTORNEY Nov. 7, 1950  J. T. HAYWARD  2,528,883
WEIGHT ON BIT INDICATOR
Filed Jan. 31, 1946  3 Sheets-Sheet 2

INVENTOR
John T. Hayward
BY
ATTORNEY

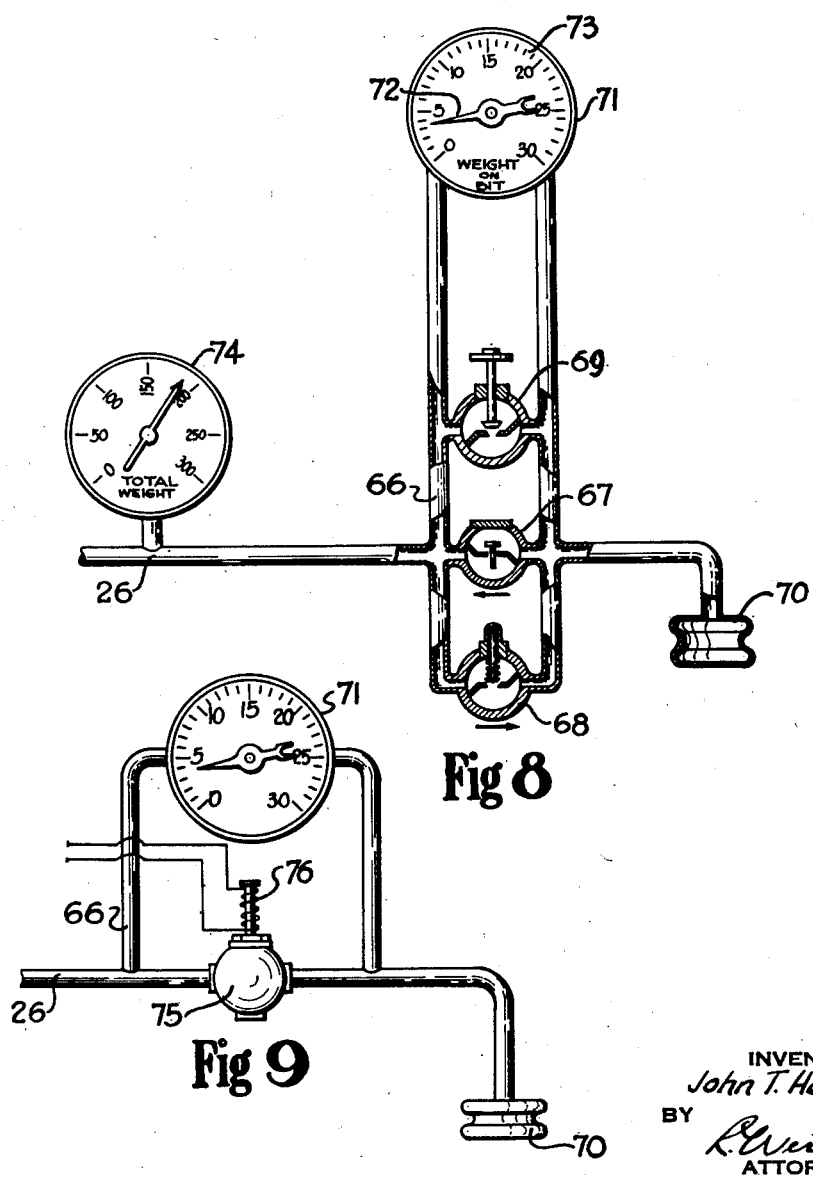

Patented Nov. 7, 1950

2,528,883

UNITED STATES PATENT OFFICE 2,528,883

WEIGHT ON BIT INDICATOR

John T. Hayward, Tulsa, Okla.

Application January 31, 1946, Serial No. 644,534

5 Claims. (Cl. 73—151)

This invention relates to weight registering devices and particularly to such devices employed in connection with earth boring equipment such as a rotary drill for registering the weight applied to the drilling bit.

Conventional weight indicators, employed particularly in connection with rotary drilling, are normally designed to indicate the total weight on the drilling string. Such indicators are normally connected with the hoisting equipment for raising and lowering the drilling string in a well and indicate the load placed upon the hoisting equipment. They are usually of the hydraulic type and consist either of a piston and cylinder containing oil placed between the traveling block and lifting hook, or of an oil-containing diaphragm clamped to some part of the hoisting line such as the "dead line," the latter type being much the more common.

Such indicators are widely used for various purposes connected with rotary drilling where an indication of the weight of the drilling string is employed to provide significant information with respect to drilling conditions. A particularly important use is the determination of the weight carried on the bit during drilling. Proper downward pressure on the bit determines the drilling rate, avoids corkscrewing of the lower joints of the drilling pipe and controls the straightness of the hole. If too much weight is carried, the hole tends to deviate from the vertical and it is common drilling procedure to run frequently a tool to determine how far the hole is off from the vertical and to govern the weight carried on the bit accordingly.

However, conventional weight indicators do not record directly the weight on the bit which is the information most frequently desired and of greatest significance in connection with the drilling operation. Such devices normally indicate only the total weight being supported by the hoisting equipment. Thus, in order to obtain the desired information, namely, the weight actually applied to the bit at the bottom of the well, it is necessary for the operator to first read the total weight which is indicated when the entire drill string is freely suspended in the well, then to lower the string until the bit is on bottom and some of the weight placed thereon and again read the indicator which will now show a reduced total weight corresponding to the original weight less the weight resting on the bit. Therefore, a calculation must be made to determine the weight on the bit. However, this relatively simple procedure is greatly complicated by the fact that as the well is deepened and the drilling string lengthened accordingly, the total weight of the string changes correspondingly and since the weight to be carried on the bit may not be changed at all or only to a small degree, repeated calculation must be made in order that the weight applied to the bit may be correctly determined and properly controlled. Since the weight carried on the bit is normally only a relatively small percentage of the total weight, errors frequently result from such calculations and such errors may and do result in severe damage to the well and the drilling equipment. This difficulty is increased by the fact that the gauges normally employed with conventional weight indicators must be capable of recording extremely large weights, as, for example, in the case of a well 10,000 feet deep, where the weight of the drilling string will be of the order of 160,000 pounds. On the other hand, the weight to be carried on the bit in such a well may be, for example, 4,000 pounds, which means that only 2½ percent of the weight of the drilling string is to be carried on the bit. This small proportion of the weight, therefore, frequently produces an error due to scale effect. That is, since the gauge scale must cover such a very large range as, for example, from zero to 200,000 pounds, or more, it is obvious that a varation of, for example, 1,000 pounds in the weight carried on the bit will be difficult to observe on such conventional weight indicators, although such a difference of 1,000 pounds in the weight carried on the bit will most likely produce very significant effects on the drilling operation. In addition, as noted above, as the drilling proceeds and the well gets deeper, the weight of the drilling string continuously increases. In order to determine, therefore, the weight that he is currently placing on the bit, the driller is compelled, while drilling, to continuously refigure the indication that should be shown on the weight indicator. It should be noted also that with the conventional weight indicators, the more weight carried on the bit, the lower the reading on the indicator and, therefore, if the driller is instructed to carry, for example, 1,000 pounds "more" on the bit, which is the usual form of instruction given to drillers, he must in reality carry 1,000 pounds less on the indicator. This procedure also leads to frequent errors. Furthermore, it is impossible for anyone, such as the drilling superintendent or engineer visiting the drilling rig, to determine from the weight indicator what weight is carried on the bit, since he must first find out what the indicator reading was when the bit was clear of the bottom, a figure which, as previously mentioned, is constantly changing.

All these difficulties are magnified when it is desired to make a continuous record of the weight carried on the bit. This is due both to the scale effect previously mentioned and to the fact that it is difficult to determine from the record made by such conventional weight recorders when the bit was on and off bottom and, therefore, to arrive at the difference.

Accordingly, the principal object of the present invention is the provision of devices which will obviate the aforementioned difficulties and to provide weight registering devices which register directly the weight carried on the bit.

Another important object of this invention is to provide weight registering devices which will directly register the weight carried on the bit and which automatically compensates for the changes in total weight of the drilling string.

A further object is to provide devices which will provide a continuous record of the weight actually carried on the bit.

Other and more specific objects and advantages of this invention will be apparent from the following detailed description when read in conjunction with the accompanying drawings which illustrate several embodiments in accordance with this invention.

In the drawings:

Fig. 1 illustrates the general arrangement of apparatus in accordance with this invention mounted on a drilling rig;

Fig. 2 is an assembly of apparatus for indicating and recording the weight on the bit in accordance with this invention;

Fig. 3 illustrates details of the apparatus shown in Fig. 2;

Figs. 4 and 5 illustrate another modification of the weight-on-bit registering apparatus illustrated in the preceding figures;

Fig. 8 illustrates still another embodiment in accordance with this invention; and Fig. 9 illustrates a modification of the embodiment illustrated in Fig. 8.

Figure 5:
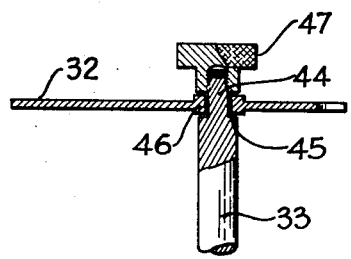

As used herein, the term "register" is intended generally to include both "indicate" and "record".

Referring now to Fig. 1, the upper portion of a well 10 is shown which is being drilled by the rotary method. The rotary drilling apparatus is conventional and is shown in very simplified form. This apparatus includes a derrick structure 11 having a floor 12 mounted on foundation members 13. A string of drill pipe having a drill bit (not shown) at its lower end and Kelly joint 14 and mud swivel 15 at its upper end is supported from the upper portion of derrick 11 by means of bail 16, hook 17, traveling block 18, crown block 19 and cable 20. One end of cable 20 is wound upon draw works drum 21 and the other end, commonly known as the "dead line" and designated by the numeral 21a, is connected to an anchor bolt 22 which is fastened to the derrick structure. Mounted upon derrick floor 12 is a rotary table 23 for the purpose of rotating Kelly joint 14 and hence the entire drill string.

A weight indicator, indicated generally at 24, including a pressure element 25, a gauge line 26 and a gauge 27, is shown mounted on dead line 20a in a manner conventional in this art. While the weight indicator 24 is shown mounted on the dead line, it will be understood, of course, that this arrangement is shown only by way of example since, as is well known in the drilling art, such weight indicators may also be mounted at other points along the hoisting system which will reflect the load carried by the hoisting system. Another conventional arrangement is to mount a hydraulic type weight indicator between the traveling block 18 and hook 17. An electrical recorder 27a, of conventional construction, is connected to gauge 27 in any suitable manner for recording the quantities registered by the gauge.

Referring to Fig. 2, pressure element 25 includes a diaphragm 28 mounted in an oil filled diaphragm casing 29. The diaphragm 28 is provided with a centrally positioned follower 30 which is in contact with a point in dead line 20a. The dead line is slidably strung through shackles 31 carried by the casing 29 on opposite sides of follower 30. When there is no load on hoisting line 20 and, therefore, no tension in dead line 20a, the pressure of diaphragm 28, acting through follower 30, will bend the dead line between its points of contact with shackles 31. As the load is taken on cable 20, it will be transmitted through dead line 20a causing the latter to stretch and straighten out between the shackles 31. This action overcomes the resistance of diaphragm 28 and will force the diaphragm inwardly toward the wall of casing 29, thereby compressing pressure fluid normally contained in the diaphragm chamber which flows through gauge line 26, producing an indication which, with a conventional type gauge, will correspond to the weight supported by cable 20, but which, with the form of gauge, such as gauge 27, to be described hereinafter, will indicate directly the weight carried on the bit.

In the conventional forms of weight indicators, such as that described, the gauge employed is normally calibrated to indicate the total weight carried by cable 20. Such a conventional form of gauge is shown at 74 in Fig. 8. In order to overcome the disadvantages, such as described above, in the use of this conventional type of weight indicator and gauge, it is contemplated in accordance with this invention that gauge 27 be of a novel form which is constructed and arranged to read directly the weight actually carried on the bit.

Figs. 2 and 3 illustrate in greater detail a form of gauge by which the actual weight carried by the bit may be read directly, despite continuing changes in the total weight of the drilling string which accompany deepening of the well. Gauge 27 is preferably of the so-called vernier type; that is, one in which the indicating hand describes several complete turns to cover full scale. In addition, the gauge is arranged so that the indicator hand, designated by the numeral 32, also revolves in the opposite sense to that in the usual gauge. In other words, it turns anti-clockwise for increasing total pressure. Indicator hand 32 is accurately balanced and is connected to the gauge spindle 33 which is provided at its upper end with a tapered portion 34. The connection of indicator hand 32 to spindle 33 is in the form of a simple friction coupling comprising a tubular stem 35 on the upper end of which indicator hand 32 is mounted for rotation with stem 35. The opposite end of stem 35 is split longitudinally at 36. The split end of stem 35 is pressed down over the tapered end of the spindle expanding the split end, which will frictionally grip the spindle and thereby produce the desired light frictional engagement between these members. Tapered portion 34 is provided with a circular rib 34a engageable with a circular groove 34b in stem 35 to prevent the stem from slipping off the spindle. With this form of connection indicator hand 32 will rotate with spindle 33 so long as there is no hindrance to free movement of indicator hand 32, but when rotation of the latter is arrested, the spindle will continue to rotate and slipping action will occur between the spindle and stem 35 and the attached indicator hand.

Gauge 27 is provided with a scale 37 which is calibrated to cover a range from zero to any suitable maximum weight which it is contemplated may be carried on the bit at any time during the drilling operation. As illustrated in Fig. 2, the gauge is provided with a scale ranging from 0 to 30 which is intended to correspond to a range from 0 to 30,000 pounds, the scale being marked in increments of 1,000 pounds. Pegs 38 and 39 are provided on the face of gauge 27 at opposite ends of scale 37 and extend above the face of the gauge in the path of rotation of hand 32. These pegs serves as stops to prevent movement of indicator hand 32 beyond the zero point when moving in the counter-clockwise direction and beyond the opposite end of the scale when moving in the clockwise direction.

The above described device operates in the following manner: Having in mind that the indicator hand 32 travels in the counter-clockwise direction for increasing loads, hand 32 will be against peg 39 when there is no load on the system. Now as the load is picked up by cable 20, indicator hand 32 will rotate in the counter-clockwise direction in response to the increasing load thus developed until the hand comes in contact with peg 38, after which it will slip on spindle 33 until the end of the drilling string, that is the bit, touches bottom, at which instant indicator hand 32 will, of course, indicate a zero reading on the gauge. As the weight on the bit is increased by slackening of cable 20, the total weight on cable 20 will, of course, decrease correspondingly and indicator hand 32 will then rotate in the clockwise direction and will thus indicate the amount of weight actually being carried on the bit.

As more weight is placed on the bit, indicator hand 32 will continue to rotate in the clockwise direction as the total weight on cable 20 is thereby decreased, and indicator hand 32 will thereupon register a corresponding increase in the weight on the bit. When the drilling string is to be broken for the addition, for example, of another joint of pipe, the entire drilling string will normally be supported in slips mounted in the rotary table which will, therefore, remove the entire load from cable 20 and indicator hand 32 will rotate in the clockwise direction until it strikes peg 39, at which point it will slip on spindle 33 while the latter completes the number of revolutions necessary to attain the zero total load position.

When the new joints are added to the drill string, thereby increasing its total weight, and the weight is again taken on cable 20, indicator hand 32 will again rotate counter-clockwise until it strikes peg 38 at which point it will again slip until the spindle has rotated sufficiently to correspond to the full weight of the drilling string, and when the bit touches bottom, indicator hand 32 will again be in a position to resume its clockwise movement from the zero position as weight is applied to the bit. It will be evident, therefore, that indicator hand 32, by means of the arrangement described, will automatically reset itself at each change in the total weight of the drilling string and will at all times register directly the actual weight applied to the bit.

The weight on the bit, as registered by gauge 27 may be recorded electrically by providing a conventional form of resistance 40 with which indicator hand 32 is in sliding contact by means of a slide 41. Electrical leads 42 and 43 connect, respectively, one end of resistance and indicator hand 32 to the binding posts of recorder 27a which, as indicated previously, is of any suitable and conventional form adapted to record the signal received from gauge 27 on a strip chart calibrated in terms of the weight on the bit. It will be understood that the chart of the recorder may be driven by a clock in order to provide a time record of the weight on the bit or may be driven, in the well-known manner, from the drilling rig to move in accordance with the progressive deepening of the well, to thereby obtain a continuous record of the weight-on-bit relative to the depth of the well. Such a drive has been disclosed in Hayward U. S. Patents Nos. 2,166,212 and 2,326,219.

Figs. 4 and 5 illustrate another arrangement for connecting indicator hand 32 to spindle 33 of the gauge, by which indicator hand 32 may be set manually to compensate for the changes in the total weight of the drilling string. In this embodiment the upper end of spindle 33 is reduced in diameter forming a shaft 44 and shoulder 45. The portion of shaft 44 adjacent shoulder 45 is left smooth and the outer end portion of the shaft is threaded. Indicator hand 32 is provided with a circular hub 46 which is mounted on shaft 44, enclosing the non-threaded portion, and is rotatable thereon. Knurled nut 47, threaded internally, is screwed on the threaded end of shaft 44 and compresses hub 46 against shoulder 45, thus locking indicator hand 32 to spindle 33.

With this arrangement, pegs 38 and 39 employed with the embodiment illustrated in Fig. 2 become unnecessary. As in the previously described embodiment, spindle 33 is arranged to rotate in the counter-clockwise direction with increasing total load on cable 20. When the weight is being taken on cable 20, nut 47 may be unscrewed to release indicator hand 32 momentarily until spindle 33 has reached the limit of its turning movement in the counter-clockwise direction corresponding to the point at which the entire load is supported by cable 20. Indicator hand 32 is then turned manually about shaft 34 until the pointer registers with the zero point on the gauge scale, whereupon nut 47 is screwed down tightly in order to lock the indicator hand to spindle 33. Now, as the weight is applied to the bit, thereby reducing the total weight supported by cable 20, spindle 33 will rotate in the clockwise direction carrying with it indicator hand 32 which will then indicate the resulting reduction in total weight in terms of the weight on the bit as measured by the calibrations of the gauge scale.

With this modification it will be necessary, of course, to reset indicator hand 32 to the zero position, for each change in the total weight supported by cable 20. When this is done, the indicator hand will, in each case, indicate the weight carried on the bit in the manner described. If desired, this modification may be arranged to include a resistance wire, such as above described, in connection with Fig. 2, and weight on the bit recorded electrically in the same manner.

Figure 6:
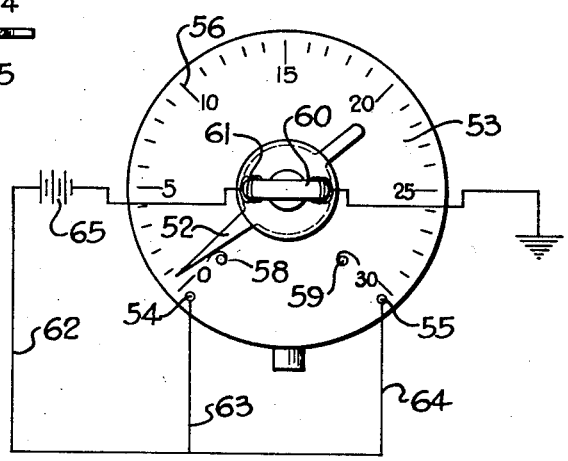
Figs. 6 and 7 illustrate a further embodiment in accordance with this invention.
Figure 7:
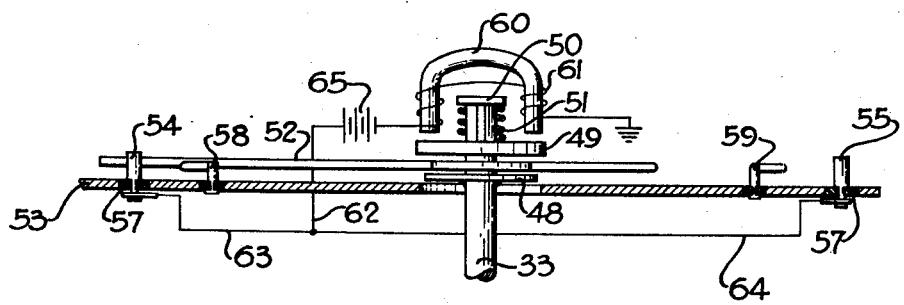

Figs. 6 and 7 illustrate a further modification of the indicator hand arrangement employed in connection with the embodiment illustrated in Figs. 2 and 3, and which is particularly useful in cases where excessive vibration around the drilling rig may produce uncontrolled slippage of the friction coupling between indicator hand 32 and spindle 33. In this modification electro-magnetic means is employed to automatically control the slippage of the indicator hand on the gauge spindle. Spindle 33 has mounted thereon a pair of spaced circular plates 48 and 49. Plate 48 which is the lower of the two, and is referred to as the drive plate, is rigidly fastened to the spindle, while plate 49, referred to as the pressure plate, is splined to the spindle so as to permit longitudinal movement thereon, but no rotary movement relative to the spindle. The end of the spindle which extends above the upper face of plate 49 is provided with an end flange 50 and a coil spring 51 is mounted on the end of the spindle between flange 50 and the upper face of pressure plate 49 and normally tends to force this plate downward toward drive plate 48. An indicator hand 52 is loosely mounted on spindle 33 between plates 48 and 49 and is freely rotatable on the spindle. Dial 53 of the gauge is provided with a pair of pegs 54 and 55 arranged at the opposite ends of scale 56 of the gauge in the same manner as described in connection with Fig. 2. Pegs 54 and 55 are made of electrically conducting metal and are mounted in insulating bushings 57 set in dial 53.

A pair of spring detents 58 and 59 are mounted adjacent pegs 54 and 55, respectively, in such position as to normally hold the end of indicator hand 52 slightly away from pegs 54 and 55. Indicator hand 52 and drive plate 48 are constructed of non-magnetic material while pressure plate 49 is made of soft iron or similar magnetic material. An electro-magnet 60 is mounted over pressure plate 49 in a position to attract pressure plate 49 and draw it upwardly when the magnet is energized by the flow of current through coil 61. One end of coil 61 is connected to ground and the other end is connected through a lead 62 to parallel leads 63 and 64 which are connected to pegs 54 and 55, respectively. A battery 65 is connected into lead 62. This device operates in the following manner:

Spindle 33 again is arranged to rotate in the counter-clockwise direction for increasing weights carried by cable 20. The action of coil spring 51 acting on pressure plate 49 normally clamps indicator hand 52 against driving plate 48, and under these conditions, the indicator hand will rotate with spindle 33. When the weight of the drilling string is taken on cable 20, indicator hand 52, thus clamped between plates 48 and 49, will be rotated by spindle 33 in the counter-clockwise direction until the hand strikes peg 54, the force of rotation of spindle 33 being sufficient to cause indicator hand 52 to depress detent 58 and permit the end of indicator hand to strike peg 54. The resulting contact of the hand with peg 54 closes the circuit through coil 61, energizing the magnet which attracts pressure plate 49 and release hand 52, thereby permitting spindle 33 to continue its rotation until it reaches a position corresponding to the total weight supported by cable 20. With indicator hand 52 thus freed, detent 58 will act to push it away from peg 54 breaking the electrical contact and again clamping indicator hand 52 to the spindle. Now, as weight is applied to the bit, reducing the total weight, indicator hand 52 will rotate in the clockwise direction and register the weight carried on the bit. Again, when it is desired to add joints to the drilling string and the weight of the string is supported in the usual slips, indicator hand 52 will rotate in the clockwise direction until it strikes peg 55. This will re-energize the electromagnet and release indicator hand 52, allowing the spindle to complete its rotations to a position corresponding to zero total weight. Detent 59 will then break the contact of the hand with peg 55 and the hand will again be clamped to the spindle of rotation in the counter-clockwise direction when the weight of the drilling string is again taken on cable 20.

With the arrangements above described it will be evident that a means is provided for obtaining direct readings of the actual weight on bit irrespective of any changes which may occur during the course of the drilling in the weight supported by cable 20; that the disadvantages referred to heretofore which are common to conventional weight indicators are thereby avoided; and that the advantages of a direct reading weight-on-bit indicator are attained.

Fig. 8 illustrates still another embodiment in accordance with this invention in which gauge line 26 leading from pressure element 25 is connected to a manifold 66, containing valves 67, 68 and 69 in parallel arrangement, a bellows 70, and a differential gauge 71. Valve 67 is a conventional check valve, arranged, as indicated by the arrow in the drawing to pass fluid only in the direction away from diaphragm casing 29 (see Fig. 2). Valve 68 is a spring loaded check valve, also of conventional construction, which is arranged to pass fluid only in the direction toward diaphragm casing 29. Valve 69 is a conventional hand-operated valve which is employed for purposes of rendering the weight indicating system inoperative when desired. Gauge 71 is a differential pressure gauge of any suitable standard or conventional form or construction for registering the differential pressure on opposite sides of check valve 67. Bellows 70 is also of conventional construction and is designed to receive and store pressure fluid, expressed from pressure element 25, under the pressure of the system and to provide the necessary back pressure required for operation of the differential pressure gauge 71. Differential pressure gauge 71 is provided with the usual indicator hand 72 and a scale 73, calibrated in a suitable manner to cover the range of weights expected to be applied to the bit, as for example, from zero to 30,000 pounds. An ordinary type pressure gauge 74 is connected into gauge line 26 and is calibrated to display the total weight supported by cable 20 in the usual manner. This gauge is of no moment for the purposes of this invention but may be employed; if desired, to obtain information as to the total weight of the drilling string.

The operation of this embodiment is as follows: With the drilling string hanging in the derrick, gauge 74 will show the total weight in the usual manner and some of the fluid forced from diaphragm casing 29 will flow through pipe 26 and through check valve 67 into bellows 70, which will be, of course, expanded thereby. When the bit touches bottom and some of the weight of the driling string is applied thereto, the pressure in diaphragm casing 29 will be thereby reduced, check valve 67 will close, preventing the return of pressure fluid to casing 29, and differential pressure gauge 71 will register, the differential pressure in the gauge line on opposite sides of check valve 67, the back pressure being supplied by bellows 70. This differential pressure will correspond to the difference between the total weight of the drilling string and this weight less that applied to the bit, thereby producing a measurement of the weight applied to the bit. When a new joint of pipe is to be added to the drilling string, the drilling string will be set in the slips in the rotary table in the usual manner, causing the pressure in diaphragm casing 29 to fall to zero. The resulting increased differential pressure across the manifold causes pressure fluid to flow back from bellows 70 through the spring loaded check valve 68 until the pressure in the system is equalized. Therefore, when the full weight of the drilling string again comes on cable 20 and the pressure rises in diaphragm casing 29, the differential pressure gauge 71 will again be returned to zero and will thus be automatically reset and in position to again measure the differential pressure when weight is again applied to the bit. Globe valve 69 may be opened when it is desired to render this form of weight indicating system inoperative.

Fig. 9 illustrates a modification of the embodiment illustrated in Fig. 8 in that valves 67, 68 and 69 are replaced by a single valve 75, which is operated by means of a solenoid 76. The leads of solenoid 76 are connected to an "on-bottom" switch employed with a well-depth recorder which is operative to de-energize solenoid 76 and allow valve 75 to close whenever the drilling bit touches bottom, valve 75 being held normally open by solenoid 76 at all other times. Such a switch and its circuit connected to a well-depth recorder are described in detail in the aforesaid Hayward U. S. Patent No. 2,326,219.

The operation of this modification is as follows: Valve 75 is normally open and remains open during all movements of the drilling string prior to the instant the drilling bit touches the bottom of the well, since, under these conditions, the circuit arrangement referred to in U. S. Patent No. 2,326,219 will be such as to cause current to flow through solenoid 76 and energize the same. With valve 75 open, differential gauge 17 will, of course, register zero weight on the bit. As soon as the bit reaches the bottom of the well, the on-bottom switch will open the circuit to solenoid 76 de-energizing the same and closing valve 75, and differential gauge 71 will thereafter register the differential pressure across valve 75 which will be proportional to the weight on the bit. As soon as the drilling string including the drilling bit is lifted above the bottom of the well for any reason, the solenoid will again be energized, opening valve 75 and differential gauge 17 will again return to zero. With this arrangement, it will be evident that differential gauge 71 will always register the weight on the bit irrespective of any changes in the total weight of the drilling string.

Various alterations and changes may be made in the embodiments herein described without departing from the scope of the appended claims but within the spirit of this invention.

What I claim and desire to secure by Letters Patent is:

1. In earth boring apparatus including a drilling string including a drilling bit, means to support said drilling string and load-responsive means operatively connected with such support means, a weight-on-bit register comprising a weight-registering gauge having a spindle rotatively driven by said load-responsive means in one direction for increasing loads and in the opposite direction for decreasing loads on such support means over a range corresponding to the maximum weight attained by said drilling string, a pointer frictionally driven by said spindle, and spaced stop means cooperating with said pointer to limit the movements thereof in both said directions over a pre-determined range less than that covered by said spindle.

2. In earth boring apparatus including a drilling string including a drilling bit, means to support said drilling string and load-responsive means operatively connected with such support means, a weight-on-bit register, comprising a weight-registering gauge having a spindle rotatively driven by said load-responsive means in one direction for increasing loads and in the opposite direction for decreasing loads on such support means over a range corresponding to the maximum weight attained by said drilling string, a pointer frictionally driven by said spindle, spaced stop means cooperating with said pointer to limit the movements thereof in both said directions over a pre-determined range less than that covered by said spindle, and means cooperating with said pointer for registering load measurements within said pre-determined range.

3. In earth boring apparatus including a drilling string including a drilling bit, means to support said drilling string and load-responsive means operatively connected with such support means, a weight-on-bit register comprising a weight-registering gauge having a spindle rotatively driven by said load-responsive means in the counter-clockwise direction for increasing loads and in the clockwise direction for decreasing loads on such support means over a range corresponding to the maximum weight attained by said drilling string, a pointer frictionally driven by said spindle, spaced stop means cooperating with said pointer to limit the movement thereof in both said directions over a pre-determined range less than that covered by said spindle, and a scale cooperating with said pointer for registering load measurements within said pre-determined range and having calibrations of increasing magnitude in the clockwise direction.

4. In earth boring apparatus, including a drilling string including a drilling bit, means to support said drilling string and load-responsive means operatively connected with said support means, a weight-on-bit register, comprising a weight-registering gauge having a spindle rotatively driven by said load-responsive means in one direction for increasing loads and in the opposite direction for decreasing loads on said support means over a range corresponding to the maximum weight attained by said drilling string, a pointer driven by said spindle, spaced stop means arranged in the path of said pointer to define a pre-determined range of movements therefor less than that covered by said spindle, and electromagnetic clutch means releasably connecting said pointer to said spindle and actuable upon contact of said pointer with either of said stop means to release said pointer from said spindle.

5. A weight-on-bit register for use with earth boring apparatus which includes a drilling string, means to support said drilling string and load-responsive means operatively connected with such support means, said register comprising, a weight registering gauge having a spindle adapted to be rotatively driven by said load-responsive means in one direction for increasing loads and in the opposite direction for decreasing loads on said support means over a range corresponding to the maximum weight attained by said drilling string, a pointer driven by said spindle, spaced stop means arranged in the path of said pointer, means effective upon engagement of said pointer with either of said stop means to permit relative rotation of the pointer and spindle to limit the movement of the pointer in both directions to a pre-determined range less than that covered by the spindle.

JOHN T. HAYWARD.

REFERENCES CITED

The following references are of record in the file of this patent:

UNITED STATES PATENTS

| Number | Name | Date |
|---|---|---|
| 507,107 | Chatillon | Oct. 24, 1893 |
| 1,622,784 | Hild | Mar. 29, 1927 |
| 2,109,297 | McMurry et al. | Feb. 22, 1938 |
| 2,133,016 | Brantly | Oct. 11, 1938 |
| 2,235,279 | Bunker | Mar. 18, 1941 |
| 2,298,216 | Lamberger | Oct. 6, 1942 |
| 2,309,211 | Raphael | Jan. 26, 1943 |